(12) United States Patent
Ton-That et al.

(10) Patent No.: US 7,041,716 B2
(45) Date of Patent: May 9, 2006

(54) CELLULOSE FILLED THERMOPLASTIC COMPOSITES

(75) Inventors: Minh-Tan Ton-That, Montreal (CA); Florence Perrin-Sarazin, Montreal (CA); Johanne Denault, Longueuil (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/617,185

(22) Filed: Jul. 11, 2003

(65) Prior Publication Data

US 2005/0009960 A1 Jan. 13, 2005

(51) Int. Cl.
*C08K 3/10* (2006.01)

(52) U.S. Cl. .................. 524/13; 524/436; 524/437; 525/8; 525/54.3; 525/64

(58) Field of Classification Search .............. 525/8, 525/54.3, 64; 524/13, 436, 43
See application file for complete search history.

(56) References Cited

U.S. PATENT DOCUMENTS

| | | | |
|---|---|---|---|
| 4,323,625 A | * | 4/1982 | Coran et al. ............... 428/361 |
| 4,409,345 A | | 10/1983 | Moteki et al. |
| 4,755,553 A | * | 7/1988 | Kishimura et al. ......... 524/531 |
| 5,134,179 A | * | 7/1992 | Felegi et al. ............... 524/13 |
| 6,066,278 A | * | 5/2000 | Got et al. .................. 264/115 |
| 6,274,248 B1 | | 8/2001 | Goto et al. |
| 6,537,653 B1 | | 3/2003 | Goto et al. |
| 2001/0019749 A1 | | 9/2001 | Godavarti |
| 2002/0049266 A1 | | 4/2002 | Yasuda et al. |
| 2002/0161072 A1 | | 10/2002 | Jacoby et al. |

FOREIGN PATENT DOCUMENTS

| | | |
|---|---|---|
| EP | 1026197 | 8/2000 |
| EP | PCT/CA2004/000984 | 10/2004 |
| JP | 9-59424 * | 4/1997 |

OTHER PUBLICATIONS

Espacenet abstract of Japanese patent JP63202661, Fujii Kazuo, et al., Aug. 22, 1988.
Patent Abstract of Japan publication No. 10-279910, Iida Katsuya, et al., Oct. 20, 1998.
Patent Abstract of Japan publication No. 2000-044809, Adachi Arihiro, et al., Feb. 15, 2000.

* cited by examiner

*Primary Examiner*—Rachel Gorr
(74) *Attorney, Agent, or Firm*—Anissimoff & Associates; Hans Koenig

(57) ABSTRACT

The present invention provides a thermoplastic composite comprising: a polyolefin; a cellulosic filler; a carboxylic acid and/or carboxylic acid anhydride graft polyolefin having an acid number greater than 15 mgKOH/g; and, a basic reactive filler present in an amount of 5–25 wt %, based on the weight of the composite. Such composites may be used in structural and non-structural applications and exhibit improved mechanical properties, thermal properties and/or resistance to biological degradation.

23 Claims, No Drawings

CELLULOSE FILLED THERMOPLASTIC COMPOSITES

FIELD OF THE INVENTION

The present invention relates to cellulose filled thermoplastic composites, for use in structural and non-structural applications.

BACKGROUND OF THE INVENTION

Composite materials comprising a mixture of a cellulose filler and a granular olefin series thermoplastic material are molded by compression molding, rotational molding, extrusion molding or injection molding, and such a composite material products are widely used in a variety of structural applications, such as in parts, panels, beams, boards and sheets. Mechanical properties, such as flexural properties, tensile properties and impact strength, of such composite materials are important considerations for their use in structural applications. There is a continuing need in the art to improve the mechanical properties of such composites. Additionally, there is a continuing need in the art to improve the service temperature, fire resistance and biological resistance of such composites.

U.S. Pat. No. 6,066,278 discloses a composite material composed of a wood cellulose filler and an olefin series plastic having a rigidity improving agent consisting of propylene modified by maleic anhydride and a carefully calculated amount of calcium oxide so that the water of the wood cellulose filler becomes finally 2–5% by weight. Since humidity varies from one location to another, the method disclosed in this patent is difficult as the correct humidity of the wood is not always easy to determine. This patent also teaches that the use of CaO requires surface treatment of the CaO.

SUMMARY OF THE INVENTION

According to an aspect of the invention, there is provided a thermoplastic composite comprising: a polyolefin; a cellulosic filler; a carboxylic acid and/or carboxylic acid anhydride graft polyolefin having an acid number greater than 15 mgKOH/g; and, a basic reactive filler present in an amount of 5–25 wt %, based on the weight of the composite.

According to another aspect of the invention, there is provided an article of manufacture comprising a thermoplastic composite of the present invention.

According to yet another aspect of the invention, there is provided a method for producing a thermoplastic composite, the method comprising: blending a polyolefin, a cellulosic filler, a carboxylic acid and/or carboxylic acid anhydride graft polyolefin having an acid number greater than 15 mgKOH/g and 5–25 wt % based on the weight of the composite of a basic reactive filler to form a blend; and, molding the blend.

It has been surprisingly found that the combination of about 5–25 wt % basic reactive filler with a carboxylic acid and/or carboxylic acid anhydride graft polyolefin having an acid number greater than about 15 mgKOH/g in cellulose filled thermoplastic composites of the present invention leads to enhanced performance of the composite in comparison to cellulose filled thermoplastic composites of the prior art, for example, the composites described in U.S. Pat. No. 6,066,278. The composites of the present invention also lead to enhanced heat deflection temperature, fire resistance, and/or resistance to biological degradation (e.g. insects, decay, termites, etc.). Furthermore, it has been surprisingly found that the amount of basic reactive filler usable in composites of the present invention is less dependent on humidity levels in the cellulosic filler, unlike in prior art composites such as those disclosed in U.S. Pat. No. 6,066,278. In addition, composites of the present invention exhibit improved flexural, strength and/or impact properties over composites of the prior art. Also, a wider variety of basic reactive fillers may be used in composites of the present invention than are usable in composites of the prior art. Also, the basic reactive filler does not require surface treatment before use.

Further features of the invention will be described or will become apparent in the course of the following detailed description.

DETAILED DESCRIPTION

As used in the specification and the appended claims, the singular forms "a," "an" and "the" include plural referents unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The thermoplastic composite of the present invention comprises a polyolefin. The polyolefin may be a single polyolefin or a mixture of two or more polyolefins. The polyolefin may also be mixed with other types of thermoplastics and elastomers. The polyolefin acts as the matrix binder for the composite within which other components are dispersed. Polyolefins include, for example, polyethylenes (e.g., LDPE, HDPE, LLDPE, UHMWPE, XLPE, copolymers of ethylene with another monomer (e.g., ethylene-propylene copolymer)), polypropylene, polybutylene, polymethylpentene, or mixtures thereof. Polypropylene and high density polyethylene (HDPE) are of particular note. It is particularly noteworthy that recycled polyolefins may be used in this invention. The polyolefin component may be present in the composite in any suitable amount. For example, the polyolefin may be present in an amount of about 20–90%, 30–70% or 40–60%, all by weight based on the weight of the composite. There should be sufficient polyolefin present to act as an effective matrix binder for the other components of the composite.

The thermoplastic composite of the present invention comprises a cellulosic filler. The cellulosic filler acts as a reinforcement in the composite. Cellulosic filler may be obtained from any suitable source of cellulose. Some suitable sources of cellulose include, for example, wood sources (e.g. pulp, wood flour such as sawdust, wood shavings, etc. from softwood and/or hardwood), agricultural sources (e.g. fruits, grain crops, vegetables, hemp, grass, rice straw, etc.) and recycled paper, cardboard, etc. Of particular note are cellulosic fibers. The cellulosic filler may be of any suitable size distribution depending on the end use of the composite and the desired properties of the composite. A cellulosic filler can be used alone or mixed with different cellulose sources. Cellulosic filler having an average particle size of from about 0.1–20 mm, more particularly from about 0.1–5 mm are suitable. When the cellulosic filler is fibrous, the average particle size refers to the average length of the fiber. The cellulosic filler may be present in the composite in any suitable reinforcing amount. For example, the cellulosic filler may be present in an amount of about 30–80%, 30–60% or 35–50%, all by weight based on the weight of the composite.

The thermoplastic composite of the present invention comprises a carboxylic acid and/or carboxylic acid anhydride graft polyolefin having an acid number greater than about 15 mgKOH/g. The carboxylic acid and/or carboxylic acid anhydride graft polyolefin is thought to act as a coupling agent to improve interaction between the non-polar hydrophobic polyolefin component and the hydrophilic cellulosic filler component to thereby improve the performance of the composite.

The polyolefin part of the graft polyolefin may be any suitable polyolefin as discussed above for the polyolefin matrix component of the composite. It is generally preferable that the polyolefin part of the graft polyolefin is as compatible as possible with the polyolefin matrix component of the composite. For example, when the polyolefin used in the graft polyolefin is the same as the polyolefin matrix component, excellent compatibility can be achieved.

Any suitable carboxylic acid and/or carboxylic acid anhydride may be employed in the graft polyolefin. Some suitable carboxylic acids include, for example, acrylic acid, maleic acid, tetrahydrophthalic acid, fumaric acid, itaconic acid, nadic acid, and methylnadic acid. Some suitable anhydrides include, for example, maleic anhydride, tetrahydrophthalic anhydride, itaconic anhydride, nadic anhydride, and methylnadic anhydride. Maleic anhydride is of particular note.

As indicated previously, the graft polyolefin has an acid number greater than about 15 mgKOH/g. Of particular note are graft polyolefins having an acid number greater than about 35 mgKOH/g or greater than about 40 mgKOH/g, more particularly from about 40–50 mgKOH/g. The graft polyolefin preferably has a molecular weight (Mn) of less than about 50,000 g/mol. Of particular note is a molecular weight of less than about 20,000 g/mol, or from about 1000–10,000 g/mol. Graft polyolefins used in the present invention have a low molecular weight and high grafting amount of the carboxylic acid and/or carboxylic acid anhydride, which is thought to improve penetration of the graft polyolefin into the surface and pores of the cellulosic filler leading to improved interaction between the polyolefin matrix and the cellulosic filler. A single type of graft polyolefin or a mixture of two or more types of graft polyolefin may be used. Other coupling agents may be used in conjunction with the graft polyolefin.

The graft polyolefin is present in the composite in any suitable amount to impart improved interaction between the polyolefin matrix and the cellulosic filler. For example, the graft polyolefin may be present in an amount up to about 5%, by weight based on the weight of the composite. Amounts of about 0.5–4% or 1–3% by weight may be mentioned in particular.

The thermoplastic composite of the present invention comprises a basic reactive filler present in an amount of about 5–25% by weight, based on the weight of the composite. The basic reactive filler may be used alone or mixed with other types of reactive or non-reactive fillers. More than one type of basic reactive filler may be used together. Any suitable basic reactive filler may be used in the composite. For example, some suitable basic reactive fillers are CaO, MgO, $Al_2O_3$, BaO, ZnO or mixtures thereof. It is thought that the basic reactive filler reacts with both the acid part of the graft polyolefin and acid-like components in the cellulosic filler to improve the over all properties of the composite without loss in impact strength. In addition, it is thought that the basic reactive filler reduces humidity in the cellulosic filler to minimize degradation of the composite. Unlike the prior art, surface treatment of the basic reactive filler is not required in order to use the basic reactive filler in fabrication of composites of the present invention. As indicated above, the basic reactive filler is present in the composite in an amount of about 5–25% by weight. An amount of about 8–20% by weight may be particularly mentioned.

The thermoplastic composite of the present invention may further comprise additional additives. Some examples of additives include secondary reinforcements (e.g. glass fibers, glass fiber/polyolefin composites, carbon nanotubes, carbon whiskers, layered clays, metal oxide nanotubes, etc.), lubricants (e.g. stearic acid, PTFE, molybdenum disulphide, etc.), impact modifiers (e.g. ethylene-propylene rubber (EPR)), fillers (e.g. calcium carbonate, talc, carbon black, etc.), colorants, pigments, antioxidants, stabilizers, flame retardants, reheat aids, crystallization aids, acetaldehyde reducing compounds, recycling release aids, oxygen scavengers, plasticizers, flexibilizers, nucleating agents, foaming agents, mold release agents, and the like, or their combinations.

Secondary reinforcements, particularly synthetic reinforcements, are of particular note since they improve mechanical properties, especially strength and impact resistance. Additives may be used in any suitable amount for the purpose for which they are intended. Secondary reinforcements are typically added in an amount of up to about 20% by weight. Lubricants are typically added in an amount of up to about 4% by weight. Impact modifiers are typically added in an amount of up to about 10% by weight. Fillers are typically added in an amount of up to about 20% by weight.

The thermoplastic composite of the present invention may be produced by any suitable compounding and molding techniques known in the art. A discussion of such techniques may be found in the following three references: *Polymer Mixing*, by C. Rauwendaal, (Carl Hanser Verlag, 1998); *Mixing and Compounding of Polymers*, by I. Manas-Zloczower and Z. Tadmor (Carl Hanser Verlag, 1994); and *Polymeric Materials Processing: Plastics, Elastomers and Composites*, by Jean-Michel Charrier (Carl Hanser Verlag, 1991), the disclosures of which are hereby incorporated by reference in their entirety. Such techniques are well known to one skilled in the art and do not require elaboration. Outlined below are some examples of suitable techniques for forming thermoplastic composites.

In extrusion/injection molding, the components of the thermoplastic composite are dry-blended and extruded through a twin-screw extruder at an elevated temperature to compound the components. The extruded blend is injected at elevated temperature by an injection machine into a mold where the composite is formed into a desired article.

In dry-blend injection, the components of the thermoplastic composite are dry-blended and fed directly into an injection machine which injects the dry blend at elevated temperature into a mold where it is formed into a desired article.

In compression molding, the components of the thermoplastic composite are dry-blended and fed directly into a molding machine and molded at an elevated temperature under pressure to form a desired article.

The thermoplastic composite of the present invention may be used in a variety of applications, particularly in structural applications. For example, parts, boards, panels, hollow profiles, lumber and sheets of thermoplastic composite are usable in the construction industry for houses, office buildings and the like, in the automotive industry for car parts especially interior parts, etc.

EXAMPLES

Materials:

Table 1A provides information about the nature and source of materials. Table 1B provides the size distributions of fine spruce sawdust, spruce sawdust and fir sawdust. The designation MAgPP refers to maleic anhydride grafted polypropylene. The term CF refers to cellulosic filler.

TABLE 1A

| Designation | Description | Source | Notes |
|---|---|---|---|
| Polyolefins (PO): | | | |
| PP | reground and recycled polypropylene | Novoplas (Quebec, Canada) | Injection grade; MI = 5 g/min |
| PP1 | recycled polypropylene | Novoplas (Quebec, Canada) | Injection grade; MI = 8 g/min |
| HDPE | recycled high density polyethylene | Novoplas (Quebec, Canada) | Extrusion grade; MI = 0.2 g/min |
| PP 6100 SM | virgin polypropylene | Montel | Injection grade; MI = 1.2 g/min |
| PP HMI | virgin homopolypropylene | BASEL | Injection grade; MI = 35 g/min |
| Cellulosic fillers (CF): | | | |
| CF1 | fine spruce sawdust | JER EnvironTech | <2% relative humidity; average particle size of 0.5 mm |
| CF2 | spruce sawdust | JER EnvironTech | <2% relative humidity; average particle size of 0.62 mm |
| CF3 | spruce-fir saw dust | JER EnvironTech | <2% relative humidity; average particle size of 0.41 mm |
| CF4 | spruce macro fiber | JER EnvironTech | <2% relative humidity; ~10 mm in length |
| CF5 | fir shavings | JER EnvironTech | <2% relative humidity; ~5 mm in length |
| CF6 | spruce sawdust and fiber and shavings | JER EnvironTech | <2% relative humidity |
| CF7 | spruce fiber | JER EnvironTech | <2% relative humidity; ~0.5 mm in length |
| CF8 | banana fiber | JER EnvironTech | Phillipines banana |
| CF9 | spruce sawdust | JER EnvironTech | <2% relative humidity |
| CF10 | wet spruce sawdust of CF9 | JER EnvironTech | 19% relative humidity |
| Graft polyolefin: | | | |
| Epolene-43 (E43) | maleic anhydride (MA) grafted polypropylene | Eastman Chemicals | AN = 45; Mn = 9,100; ~3.81 wt % of MA |
| Epolene-3015 (E3015) | maleic anhydride (MA) grafted polypropylene | Eastman Chemicals | AN = 15; Mn = 47,000; ~1.31 wt % of MA |
| Epolene-3003 (E3003) | maleic anhydride (MA) grafted polypropylene | Eastman Chemicals | AN = 8; Mn = 52,000; ~0.71 wt % of MA |
| Basic reactive filler: | | | |
| CaO(1) | calcium oxide | Labaratoire Mat | 98% purity |
| CaO(2) | Calcium oxide | The C.P. Hall Company | Max 92% CaO |
| $Al_2O_3$ | aluminum oxide | Malakoff Industries | ~0.4–0.5 μm in size |
| Other additives: | | | |
| GF/PP | long glass fiber-PP pellet (10 mm long) | BayComp | 50 wt % glass fiber; secondary reinforcement |
| $CaCO_3$ | calcium carbonate | Genstar | Camel cal; filler |
| SA | stearic acid | JT Baker Inc. | lubricant |
| EPR | ethylene-propylene rubber | DSM Sarlink 4190 | impact modifier |

TABLE 1B

| Type | Average Particle Size (mm) | | | | | |
|---|---|---|---|---|---|---|
| | 0.15 | 0.25 | 0.4 | 0.7 | 1.1 | 1.9 |
| Fine spruce sawdust | 7% | 25% | 26% | 33% | 9% | 0% |
| Spruce sawdust | 6% | 9% | 27% | 42% | 16% | 0% |
| Spruce-fir sawdust | 6% | 3% | 12% | 23% | 38% | 18% |

Compounding/Processing:

Cellulose filled thermoplastic composites were prepared by extrusion-injection, dry-blend injection or compression techniques. For dry-blend injection and compression techniques, a blend of polyolefin and graft polyolefin may be made by extrusion prior to dry blending with the other components.

For extrusion-injection, extrusion was performed in a twin-screw extruder Extrusion Spec W&P 30 mm having L/D=40; speed=150–175 rpm; $T_{max}$=185° C. and injection was performed using a BOY™ 30A injection machine at T=200° C. In a typical extrusion/injection process, cellulose filler (e.g. spruce sawdust), basic reactive filler (e.g. CaO), polypropylene, maleic anhydride grafted polypropylene, and any other desired reinforcements or fillers were first dry-blended together before extrusion through the twin-screw extruder. The extrudate was then injected into a mold by the injection machine.

For dry-blend injection, injection was performed using a BOY™ 30A injection machine at T=200° C. In a typical dry-blend injection process, cellulose filler (e.g. spruce sawdust), basic reactive filler (e.g. CaO), polypropylene, maleic anhydride grafted polypropylene, and any other desired reinforcements or fillers were first dry-blended together before being injected into a mold by the injection machine.

For compression; molding was performed using a Wabasch™ machine at T=200° C., P=100 psi, t=5 min and then cooled to room temperature using air for 6 minutes and water for 10 minutes. In a typical compression molding process, cellulose filler (e.g. spruce sawdust), basic reactive filler (e.g. CaO), polypropylene, maleic anhydride grafted polypropylene, and any other desired reinforcements or fillers were first dry-blended together before compression molding.

Characterization:

Tensile properties (ASTM D638) were measured using the dog bone type I test at a test speed of 5 mm/min.

Flexural properties (ASTM D790) were measured using a bending test where length was 12.5 mm, test speed was 1.3 mm/min and span was 48 mm.

Impact resistance (ASTM D256) was measure using an un-notched IZOD impact test.

Samples were tested at ambient temperatures before and after conditioning in water for different periods of time between 1 and 7 days.

Microstructural observations of the composites were made using a JEOL JSM-6100™ scanning electron microscope (SEM). Observations of the dispersion between the cellulosic filler and the polyolefin matrix were made using a Leitz Dialux™ 20 optical polarised microscope (OM) and their interface using scanning electron microscopy (SEM).

Density measurements were made with a pycnometer AccuPyc™ 1330. Water absorption was determined by measuring the weight gain or loss after immersing the sample in water for 1 to 4 days. Interaction between the basic reactive filler and the graft polyolefin were studied by transmission infrared spectroscopy at room temperature (~25° C.) on a Nicolet Magna™ 860 Fourier transform instrument at a resolution of 4 cm$^{-1}$.

Interaction between the basic reactive filler and the graft polyolefin were studied by transmission infrared spectroscopy at room temperature (~25° C.) on a Nicolet Magna™ 860 Fourier transform instrument at a resolution of 4 cm$^{-1}$.

Mechanical properties of the materials at high temperature were determined by dynamical mechanical thermal analysis (DMTA) using a Rheometric Scientific instrument. Samples were subjected under torsion mode at a frequency of 1 Hz from −50 to 120° C.

Thermal stability of the composites was evaluated by Setaram™ TG 96 thermal analysis system of Scientific & Industrial Equipment. Samples were heated under argon from 25 to 500° C. at a heating rate of 10° C./min.

For estimating the flame retardency, samples were placed horizontally and one edge of the sample was just exactly above the butane gas nozzle and the distance from the lower face of the sample was 20 mm from the nozzle head. Samples were burned from one end in ambient atmosphere and the burning length was determined at each time interval.

Results:

Table 2 provides the formulation for various composites studied. Amounts are given in percentage by weight, based on the weight of the composite. Example numbers starting with the letter 'C' are comparative examples.

TABLE 2

| Ex. | Cellulosic filler | Polyolefin | Graft polyolefin | Basic reactive filler | Other additive |
|---|---|---|---|---|---|
| C1 | 40% CF1 | 58% PP | 2% E43 | | |
| 2 | 40% CF1 | 53% PP | 2% E43 | 5% CaO | |
| 3 | 40% CF1 | 48% PP | 2% E43 | 10% CaO | |
| C4 | 40% CF1 | 53% PP | 2% E43 | | 5% EPR |
| C5 | 40% CF1 | 48% PP | 2% E43 | | 10% EPR |
| C6 | 40% CF1 | 53% PP | 2% E43 | | 5% CaCO$_3$ |
| 7 | 40% CF3 | 53% PP | 2% E43 | 5% Al$_2$O$_3$ | |
| 8 | 40% CF3 | 48% PP | 2% E43 | 10% Al$_2$O$_3$ | |
| 9 | 40% CF3 | 48% PP | 2% E43 | 5% CaO | |
| 10 | 40% CF3 | 43% PP | 2% E43 | 10% CaO | |
| C11 | 40% CF3 | 58% PP | 2% E3015 | | |
| C12 | 40% CF3 | 53% PP | 2% E3015 | 5% CaO | |
| C13 | 40% CF3 | 48% PP | 2% E3015 | 10% CaO | |
| C14 | 40% CF1 | 58% PP | 2% E3003 | | |
| C15 | 40% CF1 | 43% PP | 2% E3003 | 10% CaO | 5% EPR |
| 16 | 40% CF9 | 58% PP1 | 2% E43 | | |
| 17 | 40% CF9 | 48% PP1 | 2% E43 | 10% CaO | |
| 18 | 40% CF9 | 48% PP1 | 2% E43 | 5% CaO | 5% GF/PP |
| C19 | 30% CF8 | 68% PP 6100 SM | 2% E43 | | |
| 20 | 40% CF9 | 48% PP 6100 SM | 2% E43 | 10% CaO | |
| C21 | 40% CF9 | 48% PP HMI | 2% E43 | | |
| 22 | 40% CF9 | 48% PP HMI | 2% E43 | 10% CaO | |
| 23 | 40% CF10 | 48% PP HMI | 2% E43 | 10% CaO | |

Table 3 provides the results of various parameters characterized for each composite.

TABLE 3

| | Tensile Properties | | | Flexural Properties | | | Impact |
|---|---|---|---|---|---|---|---|
| Ex. | Young Modulus (MPa) | Stress (MPa) | Strain at Break (%) | Elastic Modulus (MPa) | Stress (MPa) | Strain (%) | Impact Resistance (kJ/m$^2$) |
| C1 | 4180 | 34 | 2.2 | 2036 | 50 | 4.8 | 8.9 |
| 2 | 5100 | 34 | 1.9 | 2420 | 52.1 | 4.1 | 9.8 |
| 3 | 5511 | 37.8 | 1.7 | 4243 | 68.3 | 2.7 | 10.6 |
| C4 | 4297 | 30.5 | 2.6 | 1921 | 46.5 | 5 | 10.2 |
| C5 | 3662 | 28.5 | 3.3 | 1834 | 44.5 | 5.4 | 11.2 |

TABLE 3-continued

| | Tensile Properties | | | Flexural Properties | | | Impact |
|---|---|---|---|---|---|---|---|
| Ex. | Young Modulus (MPa) | Stress (MPa) | Strain at Break (%) | Elastic Modulus (MPa) | Stress (MPa) | Strain (%) | Impact Resistance (kJ/m²) |
| C6 | 4654 | 35.2 | 2.1 | 2368 | 54.5 | 4.3 | 10.1 |
| 7 | 4275 | 33.2 | 3.4 | 3460 | 58.1 | 3.2 | 11.2 |
| 8 | 4220 | 33.3 | 3.6 | 3397 | 57.9 | 3.2 | 11.1 |
| 9 | 4933 | 35.6 | 3.1 | 3914 | 61.2 | 2.8 | 10.2 |
| 10 | 5157 | 35.6 | 2.6 | 4252 | 62.5 | 2.6 | 10.4 |
| C11 | 3476 | 35.2 | 7.7 | 2482 | 62 | 5.4 | 15.67 |
| C12 | 4164 | 33.9 | 4.1 | 3210 | 59.3 | 3.6 | 13.0 |
| C13 | 4611 | 32.7 | 2.6 | 3752 | 58.1 | 2.9 | 10.1 |
| C14 | 3591 | 30.4 | 4.2 | 2664 | 57.7 | 4.4 | 11.03 |
| C15 | 4027 | 27.8 | 2.8 | 2967 | 51.4 | 3.4 | 8.85 |
| 16 | 3288 | 24.1 | 3.5 | 2580 | 44.3 | 3.5 | 7.6 |
| 17 | 4305 | 28.8 | 2.2 | 3432 | 52.0 | 2.7 | 4.5 |
| 18 | 4361 | 30.6 | 2.8 | 3657 | 54.3 | 2.9 | 10.0 |
| C19 | 3372 | 23.9 | 3.7 | 2202 | 41.7 | 6.1 | |
| 20 | 4627 | 34.2 | 2.3 | 3806 | 61.6 | 2.7 | 5.9 |
| C21 | 2619 | 24.9 | 3.0 | 2021 | 45.9 | | |
| 22 | 2923 | 25.2 | 2.3 | 2635 | 45.4 | | |
| 23 | 2903 | 23.5 | 3.1 | 2161 | 43.1 | | |

With reference to Tables 2 and 3, comparing example C1 to examples 2 and 3 illustrates that cellulose filled thermoplastic composites of the present invention (ex. 2 and 3) have significantly improved mechanical properties over a similar comparative composite (ex. C1), the comparative composite not having a basic reactive filler (e.g. CaO). Furthermore, the level of improvement provided by composites of the present invention is superior when compared with the results reported in U.S. Pat. No. 6,066,278.

Comparing examples 2 and 3 to comparative examples C4, C5 and C6, it is also evident that the use of a basic reactive filler (e.g. CaO) provides significant improvement in tensile and flexural properties than the use of an impact modifier (e.g. EPR) or a simple filler (e.g. $CaCO_3$) in a similar composite.

As evidenced by examples 7 and 8, the use of $Al_2O_3$ as the basic reactive filler provides significant improvement in flexural properties and impact resistance of the composite. Although the level of improvement to flexural properties and impact resistance is not as high as with CaO, the use of $Al_2O_3$ provides more improvement in tensile strain at break than CaO. Thus, the use of CaO or $Al_2O_3$ will depend on the specific application to which the composite will be put.

Similar results have been obtained using different cellulosic fillers and recycled polypropylenes, for example, as evidenced by examples 3, 9, C13, C15, 17 and 19.

Referring to examples 9 and 10, it is evident that increasing the amount of CaO from 5 wt % to 10 wt % results in no reduction in mechanical properties (except for tensile strain at break), but rather results in a great improvement in mechanical properties. Additionally, even when the amount of CaO is 15 wt %, there is no reduction in such mechanical properties. This is in contradiction to the teachings of U.S. Pat. No. 6,066,278, which teaches that the amount of CaO needs to be controlled carefully and kept small or there will be a reduction in the mechanical properties of the composite.

Comparative examples C11, C12 and C13 illustrate that the presence of CaO in a composite comprising E3015 (acid number<35 mgKOH/g) provides significant improvement to mechanical properties when CaO is 5 wt %, but that the improvement becomes negligible as the amount of CaO is increased beyond 5 wt %. This illustrates that the balance between the amount of basic reactive filler in the composite and the acid number of the graft polyolefin is an important consideration in respect of improvements to the mechanical properties of the cellulose filled thermoplastic composite.

The importance of balance between the amount of basic reactive filler and acid number of the graft polyolefin is further illustrated by examples C14 and C15 in which E3003 was used. E3003 has an even smaller acid number than E3015. While there is a small improvement in modulus with the addition of CaO, there is a significant reduction in both strength and impact resistance at all levels of CaO in the composite.

Example 17 illustrates that similar improvements to mechanical properties in accordance with the present invention can be obtained using another type of recycled polypropylene. In addition, example 18 illustrates that the addition of glass fiber can further increase the mechanical properties, especially the strength and impact resistance.

The effect of the type of polypropylene used was also considered. Virgin polypropylene leads to higher mechanical properties compared to recycled polypropylene as illustrated by examples 17 and 20.

For a virgin PP with very high melt index and low performance, similar improvement in the mechanical properties when CaO is used have also been obtained (example C21 as compared to example 22). Example 23 had the same type of components and formulation as example 22, except that example 22 was made using dried wood (<2% relative humidity) while the example 23 used wet wood (about 19% relative humidity). As indicated in Table 3, the mechanical properties of example 23 are poorer compared than those of example 22. Thus, while the composites of the present invention are less dependent on the humidity of the cellulose filler than prior art composites, extreme amounts of humidity in the cellulose filler can lead to some degradation in mechanical properties of the composite.

Table 4 demonstrates that the composites of the present invention also have improved mechanical properties at higher temperatures, allowing for a higher service temperature for the composites.

TABLE 4

| Example | | −20° C. | 0° C. | 20° C. | 50° C. | 100° C. |
|---|---|---|---|---|---|---|
| 22 | G' (Pa) | 2.65e+09 | 1.88e+09 | 1.42e+09 | 8.34e+08 | 3.36e+08 |
|  | G" (Pa) | 9.40e+07 | 1.03e+08 | 5.94e+07 | 5.70e+07 | 2.76e+07 |
| 23 | G' (Pa) | 2.18e+09 | 1.45e+09 | 1.05e+09 | 6.12e+08 | 2.59e+08 |
|  | G" (Pa) | 8.25e+07 | 9.41e+07 | 5.23e+07 | 4.42e+07 | 1.94e+07 |

Table 5 demonstrates that the composites of the present invention are more resistant to thermal degradation, as reflected by the higher temperatures at a weight loss of 10 wt % ($T_{10\%}$) and 20 wt % ($T_{20\%}$) and the weight loss at 500° C. as measured by TGA.

TABLE 5

| | Thermal properties | | |
|---|---|---|---|
| Example | $T_{10\%}$ (° C.) | $T_{10\%}$ (° C.) | Weight loss at 500° C. (wt %) |
| C21 | 334 | 364 | 91 |
| 22 | 346 | 398 | 73 |

Table 6 demonstrates that the composites of the present invention are more resistant to burning. The burning rate of example 22 at 1 min ($L_1$) and 5 min ($L_5$) is smaller than that of example C21. Even though the burning test used is not a standard test, it qualitatively demonstrates the flame retardancy of the composites.

TABLE 6

| Example | $L_1$ (mm) | $L_5$ (mm) |
|---|---|---|
| C21 | 12 | 65 |
| 22 | 7 | 36 |

Table 7 provides the results of water absorption tests on various cellulose filled thermoplastic composites. Amounts in the composition are given in weight percent based on the weight of the composite. Example numbers starting with the letter 'C' are comparative examples. The designation 'clay' refers to a layered clay reinforcement while 'clayexf' refers to the same clay exfoliated. The clay used was Cloisite™ 15A from Southern Clay Products.

TABLE 7

| | | Water Absorption (%) | | |
|---|---|---|---|---|
| Ex. | Composition | 24 h in water | 24 h in water, 24 h in air | 7 days in water |
| C100 | 40% CF1 60% PP | 0.6 | 0.35 | 1.85 |
| C101 | 40% CF1 56% PP 2% E43 2% SA | 0.4 | 0.25 | 0.95 |
| C102 | 40% CF1 58% PP 2% E43 | 0.35 | 0.2 | 0.9 |
| 103 | 40% CF1 53% PP 2% E43 5% CaO | 0.55 | 0.25 | 1.25 |
| 104 | 40% CF1 48% PP 2% E43 10% CaO | 0.55 | 0.3 | 1.45 |

TABLE 7-continued

| | | Water Absorption (%) | | |
|---|---|---|---|---|
| Ex. | Composition | 24 h in water | 24 h in water, 24 h in air | 7 days in water |
| C105 | 40% CF1 53% PP 2% E43 5% clay | 0.45 | 0.2 | 1.0 |
| C106 | 40% CF1 53% PP 2% E43 5% clayexf | 0.4 | 0.25 | 0.95 |

It is evident from Table 7 that even though a basic reactive filler such as CaO is present in the composite in amounts as high as 10 wt %, the extent of water absorption can be kept low, which is in contradiction to the teachings of U.S. Pat. No. 6,066,278. Furthermore, the mechanical properties of the composite of examples 103 and 104 remained unchanged even after conditioning in water up to 7 days.

FTIR studies confirmed that a chemical reaction had taken place between the maleic anhydride group of E43 and the basic reactive filler (CaO or $Al_2O_3$) during extrusion of the cellulose filled thermoplastic composites.

Other advantages which are inherent to the invention are obvious to one skilled in the art.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. A thermoplastic composite comprising:
    (a) a polyolefin;
    (b) a cellulosic filler;
    (c) a carboxylic acid and/or carboxylic acid anhydride graft polyolefin having an acid number greater than 35 mgKOH/g; and,
    (d) a basic reactive filler present in an amount of 8–20 wt %, based on the weight of the composite, the composite having a Young Modulus at least about 20% greater than the Young Modulus of a corresponding composite without the basic reactive filler.

2. The composite according to claim 1, wherein the acid number of the graft polyolefin is greater than 40 mgKOH/g.

3. The composite according to claim 1, wherein the acid number of the graft polyolefin is from 40–50 mgKOH/g.

4. The composite according to claim 1, wherein the graft polyolefin has a molecular weight of less than 50,000 g/mol.

5. The composite according to claim 1, wherein the graft polyolefin has a molecular weight of less than 20,000 g/mol.

6. The composite according to claim 1, wherein the graft polyolefin has a molecular weight of from 1000–10,000 g/mol.

7. The composite according to claim 1, wherein the graft polyolefin is present in an amount of up to 5 wt %, based on the weight of the composite.

8. The composite according to claim 1, wherein the graft polyolefin is present in an amount of 1–3 wt %, based on the weight of the composite.

9. The composite according to claim 1, wherein the carboxylic acid and/or carboxylic acid anhydride graft polyolefin is maleic anhydride graft polypropylene.

10. The composite according to claim 1, wherein the basic reactive filler is selected from the group consisting of CaO, MgO, $Al_2O_3$ and mixtures thereof.

11. The composite according to claim 1, wherein the polyolefin is present in an amount of 20–90 wt %, based on the weight of the composite.

12. The composite according to claim 1, wherein the polyolefin is polypropylene or polyethylene.

13. The composite according to claim 1, wherein the cellulosic filler is present in an amount of 30–80 wt %, based on the weight of the composite.

14. The composite according to claim 1, wherein the cellulosic filler is fibrous.

15. The composite according to claim 1, wherein the cellulosic filler is wood flour.

16. The composite according to claim 1, further comprising a secondary reinforcement, a lubricant, an impact modifier, a filler, a colorant, a pigment, an antioxidant, a stabilizer, a flame retardant, a reheat aid, a crystallization aid, an acetaldehyde reducing compound, a recycling release aid, an oxygen scavenger, a plasticizer, a flexibilizer, a nucleating agent, a foaming agent, a mold release agent or a mixture thereof.

17. A thermoplastic composite comprising:
(a) polypropylene;
(b) a cellulosic filler;
(c) maleic anhydride graft polypropylene having an acid number of greater than 35 mgKOH/g; and,
(d) a basic reactive filler present in an amount of 8–20 wt %, based on the weight of the composite, the composite having a Young Modulus at least about 20% greater than the Young Modulus of a corresponding composite without the basic reactive filler.

18. The composite according to claim 17, wherein the basic reactive filler is selected from the group consisting of CaO, MgO, $Al_2O_3$ and mixtures thereof.

19. The composite according to claim 18, wherein the maleic anhydride graft polypropylene has a molecular weight of less than 20,000 g/mol.

20. The composite according to claim 19, wherein the maleic anhydride graft polypropylene is present in an amount of 1–3 wt %, based on the weight of the composite.

21. The composite according to claim 20, further comprising glass fibers.

22. The composite according to claim 20, wherein the cellulosic filler has a relative humidity of less than 2% before reaction with the basic reactive filler.

23. The composite according to claim 1, wherein the cellulosic filler has a relative humidity of less than 2% before reaction with the basic reactive filler.

* * * * *